United States Patent
Tartamella et al.

(10) Patent No.: US 7,351,776 B2
(45) Date of Patent: Apr. 1, 2008

(54) BULK POLYMERIZATION PROCESS

(75) Inventors: Timothy L. Tartamella, Silver Lake, OH (US); William M. Cole, Clinton, OH (US); Mark Smale, Hudson, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 0 days.

(21) Appl. No.: 11/062,673

(22) Filed: Feb. 22, 2005

(65) Prior Publication Data

US 2005/0197474 A1 Sep. 8, 2005

(51) Int. Cl.
*C08F 2/04* (2006.01)
*C08F 2/02* (2006.01)
*C08F 36/04* (2006.01)

(52) U.S. Cl. ............... 526/65; 526/82; 526/88; 526/164; 526/169.1; 526/340.4; 526/902; 525/53

(58) Field of Classification Search ........... 526/82, 526/164, 340.4, 65, 88, 169.1, 340.2, 902, 526/53

See application file for complete search history.

(56) References Cited

U.S. PATENT DOCUMENTS

| | | | |
|---|---|---|---|
| 3,389,130 A | 6/1968 | Pollock | 526/162 |
| 3,458,490 A | 7/1969 | Irvin et al. | 526/68 |
| 3,759,879 A | 9/1973 | Floros | 526/65 |
| 3,770,710 A | 11/1973 | Futamura et al. | 260/83.7 |
| 3,801,555 A | 4/1974 | Johnson | 526/65 |
| 3,962,200 A | 6/1976 | de Zarauz | 526/78 |
| 3,970,607 A | 7/1976 | Bouton et al. | 526/335 |
| 4,050,901 A | 9/1977 | Pfeiffer et al. | 23/285 |
| 4,071,582 A | 1/1978 | Takahashi | 260/878 |
| 4,169,870 A | 10/1979 | Takahashi | 525/315 |
| 4,299,935 A | 11/1981 | Chatelain | 526/88 |
| 4,325,915 A | 4/1982 | Sato et al. | 422/135 |
| 4,501,865 A | 2/1985 | Konig et al. | 526/71 |
| 4,699,960 A | 10/1987 | Gordini et al. | 526/81 |
| 4,708,987 A | 11/1987 | Hergenrother et al. | 525/184 |
| 4,710,553 A | 12/1987 | Carbonaro et al. | 526/142 |
| 4,736,001 A | 4/1988 | Carbonaro et al. | 526/63 |
| 4,948,847 A | 8/1990 | Morita et al. | 526/64 |
| 4,965,327 A | 10/1990 | Stachowiak et al. | 526/88 |
| 5,017,539 A | 5/1991 | Jenkins et al. | 502/102 |
| 5,395,903 A | 3/1995 | Charmot et al. | 526/220 |
| 5,587,438 A | 12/1996 | Binsbergen et al. | 526/88 |
| 6,242,546 B1 | 6/2001 | Nakai et al. | 526/211 |
| 6,300,450 B1 | 10/2001 | Tsujimoto et al. | 526/335 |
| 6,306,976 B1 | 10/2001 | Matsuda et al. | 525/316 |
| 6,683,140 B2 | 1/2004 | Kaita et al. | 526/160 |
| 6,693,160 B1 | 2/2004 | Halasa et al. | 526/338 |
| 6,699,813 B2 | 3/2004 | Luo et al. | 502/119 |
| 6,706,830 B2 | 3/2004 | Windisch et al. | 526/170 |
| 6,747,085 B2 | 6/2004 | Sone et al. | 524/493 |
| 6,753,447 B2 | 6/2004 | Halasa et al. | 564/482 |
| 6,759,497 B2 | 7/2004 | Grün et al. | 526/340 |
| 6,765,066 B2 | 7/2004 | Ozawa | 525/314 |
| 6,770,771 B2 | 8/2004 | Johnson et al. | 556/20 |
| 2004/0097546 A1* | 5/2004 | Goulet et al. | 514/316 |
| 2004/0102589 A1 | 5/2004 | Jang et al. | 526/134 |
| 2004/0147694 A1 | 7/2004 | Sone et al. | 526/164 |
| 2005/0131174 A1 | 6/2005 | Luo et al. | 526/163 |

FOREIGN PATENT DOCUMENTS

| | | |
|---|---|---|
| CA | 1284545 | 5/1991 |
| EP | 0 127 236 A | 12/1984 |
| EP | 1 010 710 A | 6/2000 |
| WO | WO 02/068484 A | 9/2002 |
| WO | WO 03/048221 A | 6/2003 |

OTHER PUBLICATIONS

Hsieh et al, "Polymerization of Butadiene and Isoprene With Lanthanide Catalysts: Characterization and Properties of Homopolymers and Copolymers", Rubber Chemistry and Technology, vol. 58, 116-145, 1985.*
English Abstract of JP5001122 (Aug. 1993).
English Abstract of JP7330910 (Dec. 1995).
English Abstract of JP8052334 (Feb. 1996).
English Abstract of JP2000017008 (Jan. 2000).
English Abstract of JP2002012610 (Jan. 2002).
English Abstract of JP2004803 (Jan. 1990).
English Abstract of JP1153702 (Jun. 1989).
English Abstract of JP63037110 (Feb. 1988).
English Abstract of JP63030515 (Feb. 1988).

* cited by examiner

*Primary Examiner*—Fred Teskin
(74) *Attorney, Agent, or Firm*—Arthur M. Reginelli; Meredith E. Hooker (57) ABSTRACT

A method for the continuous production of polydienes, the method comprising the steps of (a) charging a mixture of one or more monomer, catalyst system, and less than 50% weight percent organic solvent based on the total weight of the monomer, catalyst and solvent, into first vessel, (b) polymerizing the monomer to a conversion of up to 20% by weight of the monomer to form a mixture of reactive polymer and monomer, (c) removing the mixture of reactive polymer and monomer from the vessel, and (d) terminating the reactive polymer prior to a total monomer conversion of 25% by weight.

34 Claims, 3 Drawing Sheets

FIG-1

BULK POLYMERIZATION PROCESS

FIELD OF THE INVENTION

This invention relates to process for the bulk polymerization of monomer.

BACKGROUND OF THE INVENTION

In bulk polymerization (also called mass polymerization), the reaction medium is typically solventless; i.e., the monomer may be polymerized in the absence or substantial absence of any solvent, and in effect, the monomer itself may act as a diluent. Since bulk polymerization involves mainly monomer and catalyst, there is reduced potential for contamination and the product separation can be simplified. Economic advantages include lower capital cost for new plant capacity, lower energy cost to operate, and fewer people to operate may be realized. The solventless feature can also provide environmental advantages with reduced emissions and wastewater pollution.

Nonetheless, bulk polymerization can require careful temperature control, and there may be a need for strong and elaborate stirring equipment since the viscosity of the polymerization system can become very high. In the absence of added diluent, the cement viscosity and exotherm effects can make temperature control very difficult. Also, cis-1,4-polybutadiene is insoluble in 1,3-butadiene monomer at elevated temperatures.

For these reasons, bulk polymerization processes have not proven to be commercially successful. Since the advantages associated with bulk systems are very attractive, there is a need to improve the polymerization systems that are conducted in bulk.

SUMMARY OF THE INVENTION

The present invention also provides a method for the continuous production of polydienes, the method comprising the steps of (a) charging a mixture of one or more monomer, catalyst system, and less than 50% weight percent organic solvent based on the total weight of the monomer, catalyst and solvent, into first vessel, (b) polymerizing the monomer to a conversion of up to 20% by weight of the monomer to form a mixture of reactive polymer and monomer, (c) removing the mixture of reactive polymer and monomer from the vessel, and (d) terminating the reactive polymer prior to a total monomer conversion of 25% by weight.

The present invention also provides a polymer of diene monomers. The polymer when derived from a lanthanide-based catalyst has a cis content of at least 97, and has at least one end that is functionalized when it is derived from a precursor with at least 40% live ends. The polymer may also be derived from a neodymium-based catalyst system, and have a Mooney viscosity ($ML_{1+4}$ at 100° C.) of from about 15 to about 45. The polymer may also be derived from a cobalt-based catalyst system, and be a branched polymer.

DETAILED DESCRIPTION OF ILLUSTRATIVE EMBODIMENTS

The present invention provides a method for the continuous production of polydienes, the method comprising the steps of (a) adding liquid conjugated diene monomer and a coordination catalyst system to a first vessel to achieve a liquid polymerization medium, where the polymerization medium includes less than 50% by weight organic solvent, (b) allowing the catalyst to polymerize the monomer into polydienes, which increases the temperature of the polymerization medium and converts a portion of the monomer to a gas-phase monomer, (c) agitating the polymerization medium to thereby facilitate conversion of a portion of the monomer to the gas-phase monomer, (d) removing the gas-phase monomer from the vessel, (e) optionally condensing the gas-phase monomer that is removed from the vessel to liquid monomer, (f) optionally transferring the condensed liquid monomer back to the first vessel, (g) removing a portion of the polymerization medium from the first vessel in order to maintain a monomer concentration within the first vessel of at least 80% by weight of the polymerization medium within the first vessel, and in order to maintain a head space within the first vessel that is about 40 to about 60% of the volume of the first vessel, where said portion of the polymerization medium that is removed includes residual monomer, (h) transferring the polymerization medium removed from the first vessel to a second vessel, (i) agitating and maintaining the flow of the polymerization medium within the second vessel, (j) maintaining sufficient temperature within the second vessel in order to convert a portion of the residual monomer to a gas-phase residual monomer, (k) optionally condensing the gas-phase residual monomer removed from the second reactor to liquid monomer, (l) optionally transferring liquid monomer converted from the gas-phase monomer removed from the second vessel to the first vessel, (m) optionally adding a functionalizing agent to the second vessel in order functionalize polydienes within the second reactor, (n) adding a quenching agent to the second vessel in order to terminate the further polymerization of monomer, and (o) recovering polydienes.

In one or more embodiments, the multi-stage bulk polymerization process of this invention includes a first stage wherein partial polymerization of available monomer is achieved in the bulk phase followed by a second stage where at least a portion of unreacted monomer is removed and the degree of polymerization is controlled.

Within the first stage, monomer is allowed to polymerize to a maximum conversion of up to about 20%, which refers to a polymerization of up to about 20% of the available monomer. In one embodiment, the maximum conversion is up to about 15%, in other embodiments up to about 12%, and in other embodiments up to about 10%.

Polymerization is conducted within a bulk system, which generally refers to the fact that the system includes less than 50%, in other embodiments less than 20%, in other embodiments less than about 10%, in other embodiments less than about 5%, and in other embodiments less than about 2% by weight organic solvent based on the total weight of the monomer, polymer, and solvent within the system. In one embodiment, the process is carried out in the substantial absence of an organic solvent or diluent, which refers to the absence of that amount of solvent that would otherwise have an appreciable impact on the polymerization process. Stated another way, those skilled in the art will appreciate the benefits of bulk polymerization processes (i.e., processes where monomer acts as the solvent), and therefore the process of this invention may be conducted in the presence of less organic solvent than will deleteriously impact the benefits sought by conducting the process in bulk. In another embodiment, the process may be carried out in the absence of an organic solvent or diluent other than those organic solvents or diluents that are inherent to the raw materials employed. In yet another embodiment, the polymerization system is devoid of organic solvent.

The term organic solvent or diluent is used herein conventionally; that is, it refers to organic compounds that will not polymerize or enter into the structure of the polymer to be produced. Typically, these organic solvents are non-reactive or inert to the catalyst composition. Exemplary organic solvents include aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain with the polymer. The performance characteristics of the polymer are generally not affected appreciably when the content of high molecular weight hydrocarbons is less than about 5% by weight of the polymer.

The first step is typically initiated by charging monomer and catalyst system to a reaction vessel. Because the polymerization can be carried out as a batch process, a continuous process, or a semi-continuous process, the manner in which the monomer and catalyst system are charged may vary. Also, the manner in which the monomer and catalyst system are charged may vary based upon the catalyst system employed.

In one or more embodiments, the first stage of the process includes a continuous polymerization process whereby catalyst and monomer are continuously fed to a vessel and a portion of the polymerization medium is continuously removed from the vessel. Inasmuch as the degree of polymerization or monomer conversion is controlled in the first stage, the polymerization medium removed from the vessel may include monomer, polymer, and residual catalyst.

The monomers that can be polymerized according to the process of this invention include volatile monomers and optionally non-volatile monomers. Volatile monomers include monomers that are sufficiently volatile to allow heat removal by vaporization of unreacted monomer at a rate equal to the rate at which heat is generated by the polymerization reaction and at a temperature that will allow the formation of the desired polymer product. In one or more embodiments, the volatile monomers include those monomers that have a boiling point that is at least 10° C., in other embodiments at least 20° C., and in other embodiments at least 30° C. lower than the desired polymerization temperature. In a particular embodiment, the monomers are devoid of halogenation; for example, vinyl chloride monomers are excluded.

Exemplary volatile monomers include, without limitation, conjugated dienes such as 1,3-butadiene, isoprene, 1,3-pentadiene, 1,3-hexadiene, 2,3-dimethyl-1,3-butadiene, 2-ethyl-1,3-butadiene, 2-methyl-1,3-penta-diene, 3-methyl-1,3-pentadiene, 4-methyl-1,3-pentadiene, and 2,4-hexadiene. Useful ɼ-olefins include ethylene, propylene, 1-butene, and 1-pentene.

In certain embodiments, it may be beneficial to control the humidity (i.e., water content) of the monomer. For example, where certain lanthanide-based catalyst systems are employed, it may be beneficial to dry the monomer. In one embodiment, where a lanthanide-based catalyst system is employed, the level of water within the monomer is reduced below about 20 ppm, in other embodiments below about 10 ppm, in other embodiments below about 5 ppm, and in other embodiments below about 3 ppm.

On the other hand, where certain cobalt-based catalyst systems are employed, it may prove useful to employ monomer having a higher humidity level. In one embodiment, where a cobalt-based catalyst system is employed, the monomer preferably has from about 30 to about 50 ppm, more preferably from about 35 to about 45 ppm, and even more preferably from about 38 to about 42 ppm water.

As those skilled in the art will appreciate, the level of water within the monomer can be adjusted. For example, where the monomer is rather wet (i.e., contains some level of water) the monomer can be dried using conventional techniques to achieve that desired water level. On the other hand, where the monomer employed is relatively dry, humidification of the monomer can be achieved. There are several methods known to those skilled in the art for humidifying the monomer. An exemplary system employs a humidification column including a bed of packing material, a layer of water, and a head space above the water. An inlet adjacent to the lower end of the cavity receives a dry hydrocarbon stream which is broken up by the packing material and dissolves water as it passes therethrough. Entrained water droplets fall out of the wet bed in a disengagement zone above the water layer leaving the hydrocarbon stream humidified yet substantially free of liquid water in an upper region of the column. This process is described in International Publication No. WO 02/072510 A1, which is incorporated herein by reference. In other processes the monomer can be mixed with the solvent or carried by the solvent, and the moisture within the solvent serving to humidify the monomer stream feed. As those skilled in the art will appreciate, the monomor can be humidified by employing several techniques.

The catalyst system employed in practicing the process of this invention preferably includes a coordination catalyst system. One type of coordination catalyst system includes lanthanide-based systems and another type includes cobalt-based systems.

In one or more embodiments, a lanthanide system is formed by combining (a) a lanthanide compound, (b) an alkylating agent, and (c) a halogen-containing compound. Other reagents such as other organometallic compounds or Lewis bases may also optionally be included. In one embodiment, the lanthanide catalyst system includes (a) neodymium neodecanoate, (b) tri isobutyl aluminum, and (c) di isobutyl aluminum chloride or isobutyl aluminum dichloride. Lanthanide catalyst systems are well known in the art as described in U.S. Pat. Nos. 3,297,667, 3,541,063, 3,794, 604, 4,461,883, 4,444,903, 4,525,594, 4,699,960, 5,017,539, 5,428,119, 5,064,910, and 5,844,050, which are incorporated herein by reference.

Various lanthanide compounds or mixtures thereof can be employed as ingredient (a) of the lanthanide catalyst composition. In one or more embodiments, these compounds are soluble in hydrocarbon solvents such as aromatic hydrocarbons, aliphatic hydrocarbons, or cycloaliphatic hydrocarbons. Hydrocarbon-insoluble lanthanide compounds, however, can be suspended in the polymerization medium to form the catalytically active species and are also useful.

Lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. In particular embodiments, these compounds include neodymium, lanthanum, samarium, or didymium. Didymium is a commercial mixture of rare-earth elements obtained from monazite sand.

The lanthanide atom in the lanthanide compounds can be in various oxidation states including but not limited to the 0, +2, +3, and +4 oxidation states. Trivalent lanthanide compounds, where the lanthanide atom is in the +3 oxidation state, are particularly useful in one or more embodiments. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Various alkylating agents, or mixtures thereof, can be used as component (b) of the lanthanide catalyst composition. Alkylating agents, which may also be referred to as hydrocarbylating agents, are organometallic compounds that can transfer hydrocarbyl groups to another metal. Typically, these agents are organometallic compounds of electropositive metals such as Groups 1, 2, and 3 metals (Groups IA, IIA, and IIIA metals). Preferred alkylating agents include organoaluminum and organomagnesium compounds. Where the alkylating agent includes a labile halogen atom, the alkylating agent may also serve as the halogen-containing compound. In one or more embodiments, mixed alkylating systems may be used such as those disclosed in U.S. Ser. No. 10/737,591, which is incorporated herein by reference.

The term "organoaluminum compound" refers to any aluminum compound containing at least one aluminum-carbon bond. Organoaluminum compounds that are soluble in a hydrocarbon solvent are preferred. Where the alkylating agent is an organoaluminum compound that includes a labile halogen atom, the organoaluminum compound can serve as both the alkylating agent and the halogen-containing compound.

One class of organoaluminum compounds that can be utilized is represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Another class of suitable organoaluminum compounds is aluminoxanes. Aluminoxanes comprise oligomeric linear aluminoxanes that can be represented by the general formula:

and oligomeric cyclic aluminoxanes that can be represented by the general formula:

where x is an integer of 1 to about 100, preferably about 10 to about 50; y is an integer of 2 to about 100, preferably about 3 to about 20; and where each $R^1$, which may be the same or different, is a mono-valent organic group that is attached to the aluminum atom via a carbon atom. Each $R^1$ may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

The term organomagnesium compound refers to any magnesium compound that contains at least one magnesium-carbon bond. Organomagnesium compounds that are soluble in a hydrocarbon solvent are preferred. One class of organomagnesium compounds that can be utilized is represented by the general formula $MgR^2_2$, where each $R^2$, which may be the same or different, is a mono-valent organic group, with the proviso that the group is attached to the magnesium atom via a carbon atom. Each $R^2$ may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Another class of organomagnesium compounds that can be utilized as ingredient (b) is represented by the general formula R3 MgX, where R3 is a mono-valent organic group, with the proviso that the group is attached to the magnesium atom via a carbon atom, and X is a hydrogen atom, a halogen atom, a carboxylate group, an alkoxide group, or an aryloxide group. Where the alkylating agent is an organomagnesium compound that includes a labile halogen atom, the organomagnesium compound can serve as both the alkylating agent and the halogen-containing compound. Preferably, R3 is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. Preferably, X is a carboxylate group, an alkoxide group, or an aryloxide group, with each group preferably containing 1 to 20 carbon atoms.

Various compounds, or mixtures thereof, that contain one or more labile halogen atoms can be employed as ingredient (c) of the lanthanide catalyst composition. These compounds may simply be referred to as halogen-containing compounds. Examples of halogen atoms include, but are not limited to, fluorine, chlorine, bromine, and iodine. A combination of two or more halogen atoms can also be utilized. Halogen-containing compounds that are soluble in a hydrocarbon solvent are preferred. Hydrocarbon-insoluble halogen-containing compounds, however, can be suspended in the oligomerization medium to form the catalytically active species, and are therefore useful.

Useful types of halogen-containing compounds include, but are not limited to, elemental halogens, mixed halogens, hydrogen halides, organic halides, inorganic halides, metallic halides, organometallic halides, and mixtures thereof.

The lanthanide catalyst composition has very high catalytic activity for polymerizing conjugated dienes into stereoregular polydienes over a wide range of catalyst concentrations and catalyst ingredient ratios. It is believed that the catalyst ingredients (a), (b), and (c) may interact to form an active catalyst species. Accordingly, the optimum concentration for any one catalyst ingredient is dependent upon the concentrations of the other catalyst ingredients. In one embodiment, the molar ratio of the alkylating agent to the lanthanide compound (alkylating agent/Ln) can be varied from about 1:1 to about 200:1, in other embodiments from about 2:1 to about 100:1, and in other embodiments from about 5:1 to about 50:1. The molar ratio of the halogen-containing compound to the lanthanide compound (halogen atom/Ln) can be varied from about 0.5:1 to about 20:1, in other embodiments from about 1:1 to about 10:1, and in other embodiments from about 2:1 to about 6:1. The term molar ratio, as used herein, refers to the equivalent ratio of relevant components of the ingredients, e.g., equivalents of halogen atoms on the halogen-containing compound to lanthanide atoms on the lanthanide compound.

The lanthanide catalyst composition can be formed by combining or mixing the catalyst ingredients (a), (b), and (c). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The production of polymer by using the lanthanide catalyst system generally employs a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

Catalyst ingredients of the lanthanide system can be charged to the vessel employed in the first stage of this process by using a variety of techniques and order of addition. In one embodiment, a small quantity of an organic solvent may be employed as a carrier to either dissolve or suspend the catalyst ingredients in order to facilitate the delivery of the catalyst ingredients to the polymerization system. In yet another embodiment, conjugated diene monomer can be used as the catalyst carrier.

In one embodiment, the lanthanide-based system may be pre-formed and aged. Specifically, the catalyst ingredients (e.g., the lanthanide compound and the alkylating agent, and the halogen-containing compound) can be combined and aged for a period of about one minute to about one hour, in other embodiments from about 3 minutes to about 30 minutes, and in other embodiments from about 5 minutes to about 20 minutes. This aging may take place in the presence of at least 80% of the monomer to be polymerized, in other embodiments at least 90% of the monomer to be polymerized, and in other embodiments at least 99% of the monomer to be polymerized. The aging process may take place at ambient temperature and pressure. In one or more embodiments, the aging process takes place without refrigeration.

The cobalt system can be formed by combining (a) a cobalt compound, (b) an alkylating agent, and (c) a halogen-containing compound. Other reagents such as other organometallic compounds or Lewis bases may also optionally be included. In one embodiment, the cobalt catalyst system includes (a) cobalt (II) 2-ethyl hexanoate (b) tri isobutyl aluminum, and (c) di isobutyl aluminum chloride or isobutyl aluminum dichloride.

Various cobalt compounds or mixtures thereof can be employed as ingredient (a) of the cobalt catalyst composition. These compounds may be soluble in hydrocarbon solvents such as aromatic hydrocarbons, aliphatic hydrocarbons, or cycloaliphatic hydrocarbons. Hydrocarbon-insoluble cobalt compounds, however, can be suspended in the polymerization medium to form the catalytically active species and are also useful.

The cobalt atom in the lanthanide compounds can be in various oxidation states including but not limited to the two oxidation state. Suitable cobalt compounds include, but are not limited to, cobalt carboxylates, cobalt organophosphates, cobalt organophosphonates, cobalt organophosphinates, cobalt carbamates, cobalt dithiocarbamates, cobalt xanthates, cobalt β-diketonates, cobalt alkoxides or aryloxides, cobalt halides, cobalt pseudo-halides, cobalt oxyhalides, and organocobalt compounds Various alkylating agents, or mixtures thereof, can be used as component (b) of the cobalt catalyst composition. The alkylating agents defined above with respect to the lanthanide catalyst system may be used, and therefore the foregoing discussion is incorporated herein.

Various compounds, or mixtures thereof, that contain one or more labile halogen atoms can be employed as ingredient (c) of the cobalt catalyst composition. The alkylating agents defined above with respect to the lanthanide catalyst system may be used, and therefore the foregoing discussion is incorporated herein.

The cobalt catalyst composition has very high catalytic activity for polymerizing conjugated dienes over a wide range of catalyst concentrations and catalyst ingredient ratios. It is believed that the catalyst ingredients (a), (b), and (c) may interact to form an active catalyst species. Accordingly, the optimum concentration for any one catalyst ingredient is dependent upon the concentrations of the other catalyst ingredients. In one embodiment, the molar ratio of the alkylating agent to the cobalt compound (alkylating agent/Co) can be varied from about 80:1 to about 15:1, in other embodiments from about 60:1 to about 35:1, and in other embodiments from about 45:1 to about 55:1. And, the molar ratio of the halogen-containing compound to the cobalt compound (halogen atom/Co) can be varied from about 900:1 to about 400:1, in other embodiments from about 650:1 to about 500:1, and in other embodiments from about 550:1 to about 600:1. The term molar ratio, as used herein, refers to the equivalent ratio of relevant components of the ingredients, e.g., equivalents of halogen atoms on the halogen-containing compound to cobalt atoms on the cobalt compound.

The catalyst composition may be formed by combining or mixing the catalyst ingredients (a), (b), and (c). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The cobalt catalyst composition is preferably prepared in situ (i.e. within the first reactor) or immediately prior to adding the ingredients to the reactor such as may occur by combining the ingredients within a feed line. Also, the cobalt catalyst system may include or can be diluted in an inert organic solvent.

The production of polymer by using the cobalt catalyst system generally employs a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, the amount of the cobalt compound used can be varied from about 0.01 to about 2 mmol, in other embodiments from about 0.02 to about 1 mmol, and in other embodiments from about 0.05 to about 0.5 mmol per 100 g of conjugated diene monomer.

The polymerization reaction within the first stage can be carried out under anaerobic conditions at low temperatures and at or below the vapor pressure of the monomer at the polymerization temperature. Where a organic solvent is present within the polymerization medium, the solvent can impact the vapor pressure at which the process is conducted.

In one or more embodiments, the polymerization temperature can be maintained below about 65° C., in another embodiment below about 45° C., in other embodiments below about 40° C., and in other embodiments below about 30° C., with one or more embodiments being from about 15° C. to about 33° C. (optionally 24° C. to about 32° C.). The polymerization temperature can be controlled by externally cooling the vessel in which the reaction takes place, internally cooling the reaction by removal of monomer vapor, or by using a combination of the two methods. In one embodiment, monomer vapor can be removed from the vessel and condensed for future polymerization within the process. For example, an auto-refrigeration loop can be employed whereby monomer vapor can be removed from the vessel, condensed, and re-circulated back into the vessel. In other embodiments, the vessel can be equipped with an evaporation column that can be controlled by water flow and/or water temperature. Alternatively, the vapor can be removed, condensed, and the monomer condensate can be fed to a storage tank.

As noted above, the liquid polymerization medium may include unreacted monomer, polymer, catalyst ingredients, residual solvent, and residual contaminates. An appropriate head space may be maintained within the vessel to achieve a desired cooling effect from the vaporization of monomer. This head space, which includes that volume of the vessel that is not filled with the polymerization medium but which may contain monomer vapor, can be about 35 to about 65, and in other embodiments from about 45 to about 55 percent by volume of the vessel. One advantage of using the head space is to collapse foam, which thereby minimizes fouling issues with the reactor or peripheral equipment. The volume fraction dedicated to reactor head space can be dependent on the stability of the foam formed and the rate of monomer vaporization (rate of bubble formation) necessary to keep the reaction running isothermally. Some factors that may contribute to foam stability include the concentration of polymer, polymer molecular weight, and polymer microstructure.

The polymerization medium, which can be in the liquid phase, may be mixed by employing mixing techniques that are known in the art. For example, mixing may be achieved by the use of a pitched blade, Rushton, flat blade turbine, or helical mixer, as well as anchors or any combination thereof. Notably, certain embodiments of this invention can advantageously be carried out by employing conventional reactor equipment that may be employed in solution polymerizations. This ability to advantageously use conventional equipment results, in large part, from the fact that the low conversions maintained in the first stage do not typically result in or produce extra ordinarily high viscosities.

The vessel employed in practicing the first stage of the process of this invention can include a variety of reactors. In one embodiment, a continuously-stirred tank reactor (CSTR) can be employed. A CSTR may be characterized by a tank with a top mounted agitator running along the vertical axis of the tank. The length to diameter ratio of the reactor may be less than 3 and in other embodiments less than 2.

Once the maximum polymerization or monomer conversion is achieved in the first stage of the process, the polymerization medium is removed from the first vessel employed in the first stage and transferred to a second stage, which takes place in a second vessel. Transfer of polymer from the first stage to second stage may be accomplished by employing a pump. The pump speed can control the discharge rate out of the first vessel and the input into the second vessel. A liquid level device can be employed to measure the height within the first vessel and modulate the speed of the pump that transfers product solution from the first vessel to the second vessel. Also, in one or more embodiments, ingredients or other materials can be added at or near the pump. For example, antioxidant or solvent, or terminating agent can be added at the pump.

Within this second stage, the polymerization reaction can be terminated. Alternatively, the polymerization reaction can be terminated between the first and second stages. In other words, the polymerization reaction can be terminated by adding an appropriate terminating agent to a feed line or pump between the first vessel and second vessel. In other words, within this latter embodiment, the termination of the polymerization will begin prior to the polymerization medium entering the second vessel.

An optional aspect of the second stage of the process includes the separation of solvent and unreacted monomer from the polymer product. In those embodiments where insufficient or less than a desired amount of solvent or unreacted monomer may not be removed from the polymer product in the second stage, additional treatment of the polymer product can occur.

The polymerization reaction may be quenched prior to significant monomer conversion (or polymerization) within the second stage. The polymerization reaction may be terminated prior to a total monomer conversion of less than about 25%, where the total monomer conversion refers to the amount or degree of monomer conversion in both the first and second stages. In other embodiments, the polymerization reaction can be terminated prior to a total monomer conversion of less than 22%, in other embodiments less than 20%, and in other embodiments less than 17%. For example, if the polymerization medium is removed from the vessel in the first stage at a point where the monomer conversion is about 15%, then the polymerization reaction can be terminated within the second stage prior to the conversion of another 10% of the monomer, which would yield a total monomer conversion of about less than 25%. Those skilled in the art will be able to determine the extent to which the polymerization may be allowed to continue within the second stage without undue calculation or experimentation. Stated another way, the degree of polymerization within the second stage may be limited such that less than 5%, in other embodiments less than 3%, and in other embodiments less than 1% of the total monomer added to the system is polymerized within the second stage.

The polymerization reaction can be terminated by using many of the techniques known in the art. For example, useful techniques include the addition of a protonating or quenching agent, the addition of a coupling agent, the addition of a functionalized terminator, or a combination thereof, which react or interact with living polymer chains and prevent further growth or polymerization. In one or more embodiments, sufficient terminating agent can be added to prevent the aluminum-alkyl complexes from having an appreciable impact on the polymer product.

For example, reactive or reacting polymers can be quenched or protonated by reacting them with a proton source. Compounds or agents that can be employed to provide a proton source include water, alcohols (e.g., isopropyl alcohol), butylated hydroxy toluene (BHT), tert-butyl-catechol (TBC), as well as various other glycols and organic acids.

Also, the living or pseudo-living polymers can be reacted with a compound that will not only terminate the polymerization but also end-functionalize or couple the polymer. In one or more embodiments, the ability to react the polymer with a functionalizing agent may result from the living character or pseudo-living character of the polymer. Exemplary functionalizing or coupling agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of coupling and functionalizing agents are described in, among other places, U.S. Pat. Nos. 4,906,706, 4,990,573, 5,064,910, 5,567,784, 5,844,050, 6,977,281, and 6,992,147; Japanese Patent Application Nos. 05-051406A, 05-059103A, 10-306113A, and 11-035633A, which are incorporated herein by reference. The polymer, which may be living or pseudo-living, may be contacted with a coupling or functionalizing agent prior to contacting the polymerization mixture with the terminator or an antioxidant.

In one or more embodiments, the amount of coupling or functionalizing agent employed may vary from about 0.01 to about 100 moles, in other embodiments from about 0.1 to about 50 moles, and in other embodiments from about 0.2 to about 25 moles per mole of the living or pseudo-living polymer.

In certain embodiments, at least 80%, in other embodiments at least 90%, in other embodiments at least 95%, and in other embodiments at least 99% of the monomer (i.e., unreacted monomer) within the polymerization medium can be removed in the second stage.

In certain embodiments, at least 50%, in other embodiments at least 80%, in other embodiments at least 95%, and in other embodiments at least 99% of any solvent present within the polymerization medium can be removed during the second stage.

Monomer and solvent can be removed by employing a variety of techniques, or a combination thereof, as is known in the art. For example, the temperature of the polymerization medium can be increased or maintained at a temperature sufficient to volatize the monomer. Also, the pressure within the vessel in which the second stage of the process is conducted can be decreased, which may likewise assist in the volatilization of monomer. Still further, the polymerization medium can be agitated, which may further assist in the removal of monomer from the polymerization medium. In one embodiment, a combination of heat, decreased pressure, and agitation can be employed.

In one embodiment, the temperature of the polymerization medium within the second stage can be maintained at a temperature in excess of about 60° C., in other embodiments in excess of about 66° C., and in other embodiments in excess of about 71° C.

In one embodiment, the pressure within the vessel in which the second stage of the process is conducted can be maintained below about 10 kPa, in other embodiments below about 105 kPa, and in other embodiments below about 100 kPa.

Various methods, which are known by those skilled in the art, can be employed to agitate the polymerization medium within the second stage of the process. Agitation can expose greater surface area of the polymerization medium and thereby facilitate the evolution of unreacted monomer.

In one embodiment, a devolatizer can be employed as the vessel in which the second stage of the process is conducted. Devolatizers can include a devolatizing extruder, which typically includes a screw apparatus that can be heated by an external heating jacket. These extruders are known in the art such as single and twin screw extruders.

Alternatively, devolatizers can include extruder-like apparatus that include a shaft having paddles attached thereto. These extruder-like apparatus can include a single shaft or multiple shafts. The shaft can be axial to the length of the apparatus and the flow of polymer or polymerization medium. The polymer or polymerization medium may be forced through the apparatus by using a pump, and the shaft rotates thereby allowing the paddles to agitate the polymer or polymerization medium and thereby assist in the evolution of unreacted monomer. The paddles can be angled so as to assist movement of the polymerization medium through the devolatilizer, although movement of the polymerization medium through the devolatilizer can be facilitated by the pump that can direct the polymerization medium into the devolatilizer and may optionally be further assisted by an extruder that may optionally be attached in series or at the end of the devolatilizer (i.e., the extruder helps pull the polymerization medium through the devolatilizer).

Devolatilizers can further include backmixing vessels. In general, these backmixing vessels include a single shaft that includes a blade that can be employed to vigorously mix and masticate the polymerization medium.

In certain embodiments, combinations of the various devolatilizing equipment can be employed to achieve desired results. These combinations can also include the use of extruders. In one example, a single shaft "extruder-like" devolatilizer (e.g., one including paddles) can be employed in conjunction with a twin screw extruder. In this example, the polymerization medium first enters the "extruder-like" devolatilizer followed by the twin screw extruder. The twin screw extruder advantageously assists in pulling the polymerization medium through the devolatilizer. The paddles of the devolatilizer can be adjusted to meet conveyance needs.

In another example, a twin shaft "extruder-like" devolatilizer can be employed. In certain embodiments, the paddles on each shaft may be aligned so as to mesh with one another as they rotate. The rotation of the shafts can occur in the same direction or in opposite directions.

In yet another example, a backmixing volatilizing vessel can be followed by a twin screw extruder, which can then be followed by a twin shaft extruder-like devolatilizing vessel, which can then be following by a twin screw extruder.

Devolatilizing equipment is known in the art and commercially available. For example, devolatilizing equipment can be obtained from LIST (Switzerland); Coperion Werner & Phleiderer; or NFM Welding Engineers, Inc. (Ohio). Exemplary equipment available from LIST include DISCOTHERM™ B, which is a single shaft "extruder-like" devolatilizer including various mixing/kneading bars or paddles; CRP™, which is a dual shaft "extruder-like" devolatilizer wherein each shaft correlates with the other; ORP™, which is a dual shaft devolatilizer wherein each shaft rotates in an opposite direction to the other.

In one or more embodiments, the devolatilizers are attached to a monomer recovery system. In other words, as monomer is separated from the polymer product, the monomer can be directed to a cooling or evaporation system. The monomer that is recovered can optionally be returned as a raw material to the first stage.

In one or more embodiments, an antioxidant can be added to the polymerization medium in the second stage. Antioxidant can be added prior to entry into the second vessel (e.g., devolatizer), while in the vessel employed in the second stage, or thereafter. Useful antioxidants include those available under the tradenames Irganox™ 1076 and Irganox™ 1520. Other ingredients that are conventionally employed in rubber production can also be added during the second stage.

The second stage of the process of this invention may include or be followed by further processing of the polymerization medium. In one embodiment, further processing of the polymerization medium may include further desolventization or removal of monomer from the polymerization medium. This can be achieved by employing a variety of techniques which are known in the art. In one embodiment, further desolventization and monomer removal can be achieved by processing the polymerization medium through yet another extruder such as a single or twin screw extruder. The polymer product can then be baled, and in certain embodiments diced or pelletized prior to baling.

Figure 1:
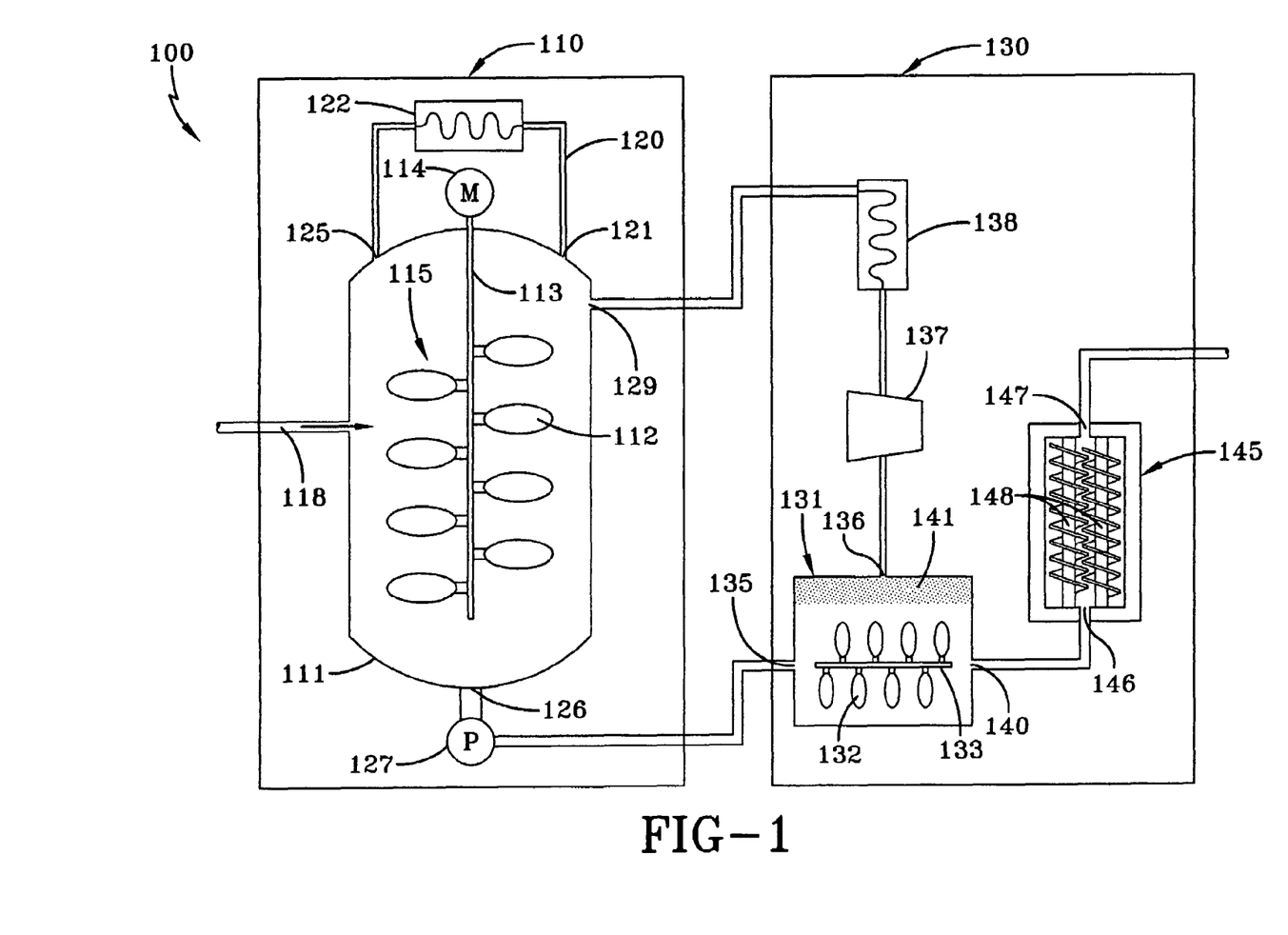
FIG. 1 is a diagrammatical depiction of an apparatus configuration useful for practicing the subject invention.

An exemplary system configuration for carrying out the process can be described with reference to FIG. 1, which shows configuration 100. In general, the first stage of the process 110 can be achieved using a continuously stirred tank reactor 111. This reactor includes mixing apparatus 115, which includes mixing blades 112 attached to shaft 113, which is driven by motor 114. Monomer and catalyst ingredients, as well as other raw materials that may be employed, can be added to reactor 111 via inlet 118 (although other inlets may exist).

The reactor 111 may also be equipped with an auto-refrigeration loop 120. Vaporized monomer can enter loop 120 via outlet 121 and directed toward condenser 122 by employing the appropriate conduit. The condensed monomer (i.e., liquid monomer) can be introduced back into reactor 111 via inlet 125. Alternatively, the condensed monomer can be directed toward and stored within a storage tank (not shown).

The polymerization medium, which may include polymer and monomer, can be continuously removed from reactor 111 via outlet 126. The polymerization medium can then be transferred to the second stage 130 by using pump 127.

Within second stage 130, the polymerization medium can be pumped from first stage 110 through appropriate conduit to devolatilizer 131, which may include various paddles 132 attached to shaft 133 that can be driven by a hydraulic or electric motor. The polymerization medium enters devolatilizer 131 at inlet 135. The force applied to the polymerization medium by pump 127 forces the polymerization medium through devolatilizer 131.

Monomer vapor that may evolve from the polymerization medium within devolatilizer 131 can exit devolatilizer 131 via outlet 136. This monomer vapor can then be compressed by compressor 137, transferred to condenser 138 via appropriate conduit, and the condensed monomer (i.e., liquid monomer) can be transferred back to first stage 110 using appropriate conduit and added to reactor 111 at inlet 129. Alternatively, the condensed monomer can then be stored within a storage tank (not shown).

The flow of polymerization medium into devolatilizer 131 via inlet 135 together with the flow of polymerization medium out of devolatilizer 131 via outlet 140 can be controlled so as to not completely fill the volume of the devolatilizer 131 and thereby create headspace 141.

Polymerization medium exiting devolatilizer 131 via outlet 140 may include less unreacted monomer than the polymerization medium entering devolatilizer 131 at inlet 135. This reduction in monomer may be due to the fact that unreacted monomer has been removed via outlet 136 and condensed. Nonetheless, the polymerization medium exiting devolatilizer 131 at outlet 140 may contain residual unreacted monomer, and therefore polymerization medium may be transferred by using appropriate conduit, to single screw extruder 145. The polymerization medium enters extruder 145 at inlet 146 and exits extruder 145 via outlet 147. Extruder 145 includes twin screw 148, which may be driven by hydraulic or electric motor. Polymer product exiting extruder 145 at outlet 147 can then be further treated by employing techniques that are known in the art including, but not limiting to, bailing.

Figure 2:
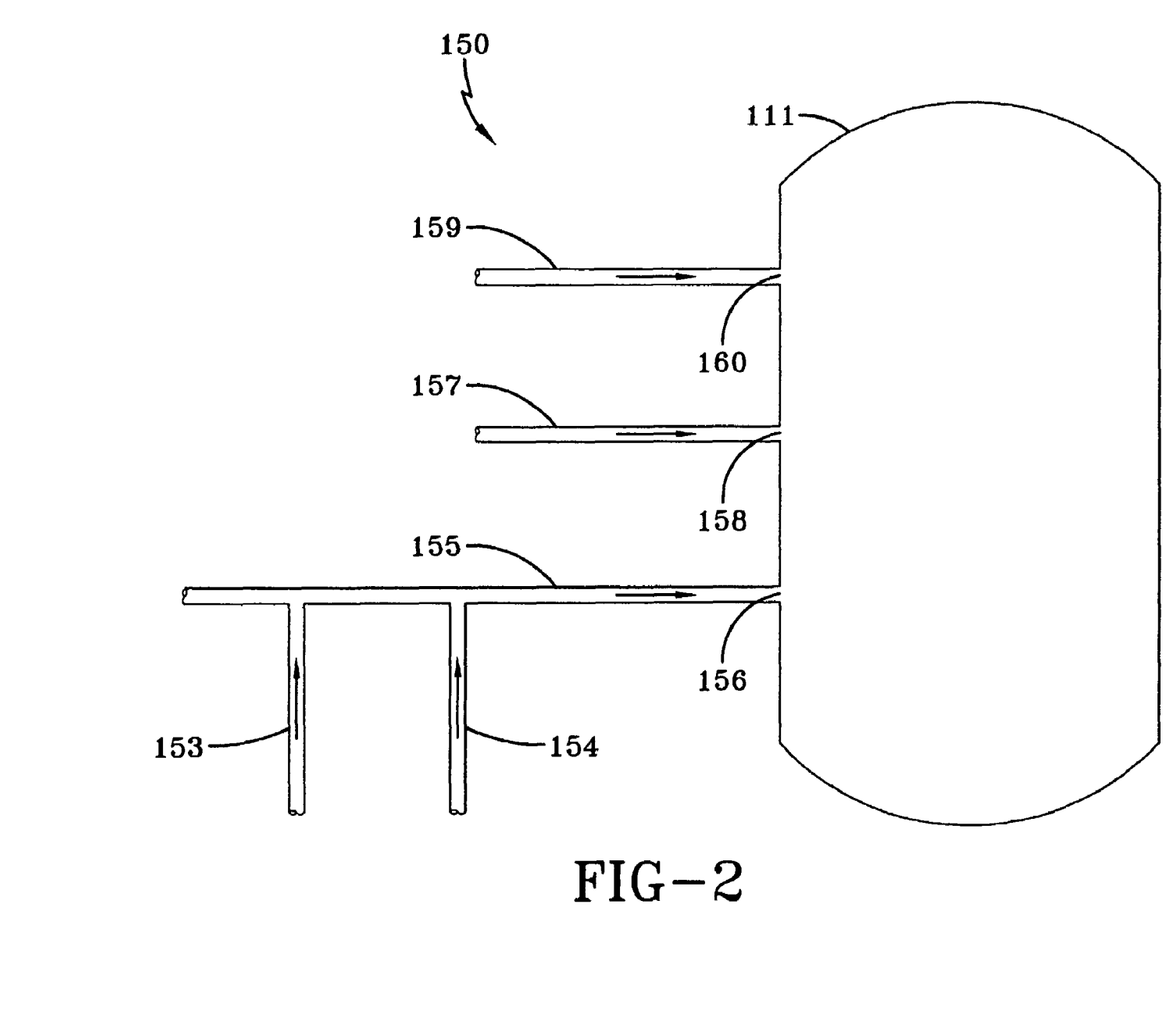
FIG. 2 is a diagrammatical depiction of a vessel for practicing the first stage of the process of this invention by employing a cobalt catalyst system.

The introduction of raw materials into reactor 111 may vary based upon the type of catalyst system employed. In one embodiment, where a cobalt catalyst system is employed, the introduction of catalyst and raw material can be achieved by employing a system as set forth in FIG. 2. Namely, the system 150 for introducing catalyst and raw material into reactor 111 may include a first feed line 155 for the introduction of alkylating agent (e.g., tributyl aluminum) and a halogen source (e.g., dibutyl aluminum chloride) via inlet 156. The alkylating agent can be fed to first feed line 155 via alkylating agent line 153, and halogen source can be fed to first feed line 155 via halogen source feed line 154. Accordingly, in this embodiment, the alkylating agent and halogen source are combined within first feed line 155 prior to introduction into reactor 111 via inlet 156. The cobalt compound can be injected into reactor 111 at inlet 158 via a second feed line 157. Monomer may enter into reactor 111 via third feed line 159 at inlet 160 (i.e., it can be added along with the alkylating agent and halogen source). Alternatively, monomer can be added via third feed line 159 into a separate or different inlet (not shown). Other ingredients, such as solvent and a gel inhibitor (e.g., 1,2-butadiene) can be injected into reactor 111 at various other inlets by employing similar type feed lines.

Figure 3:
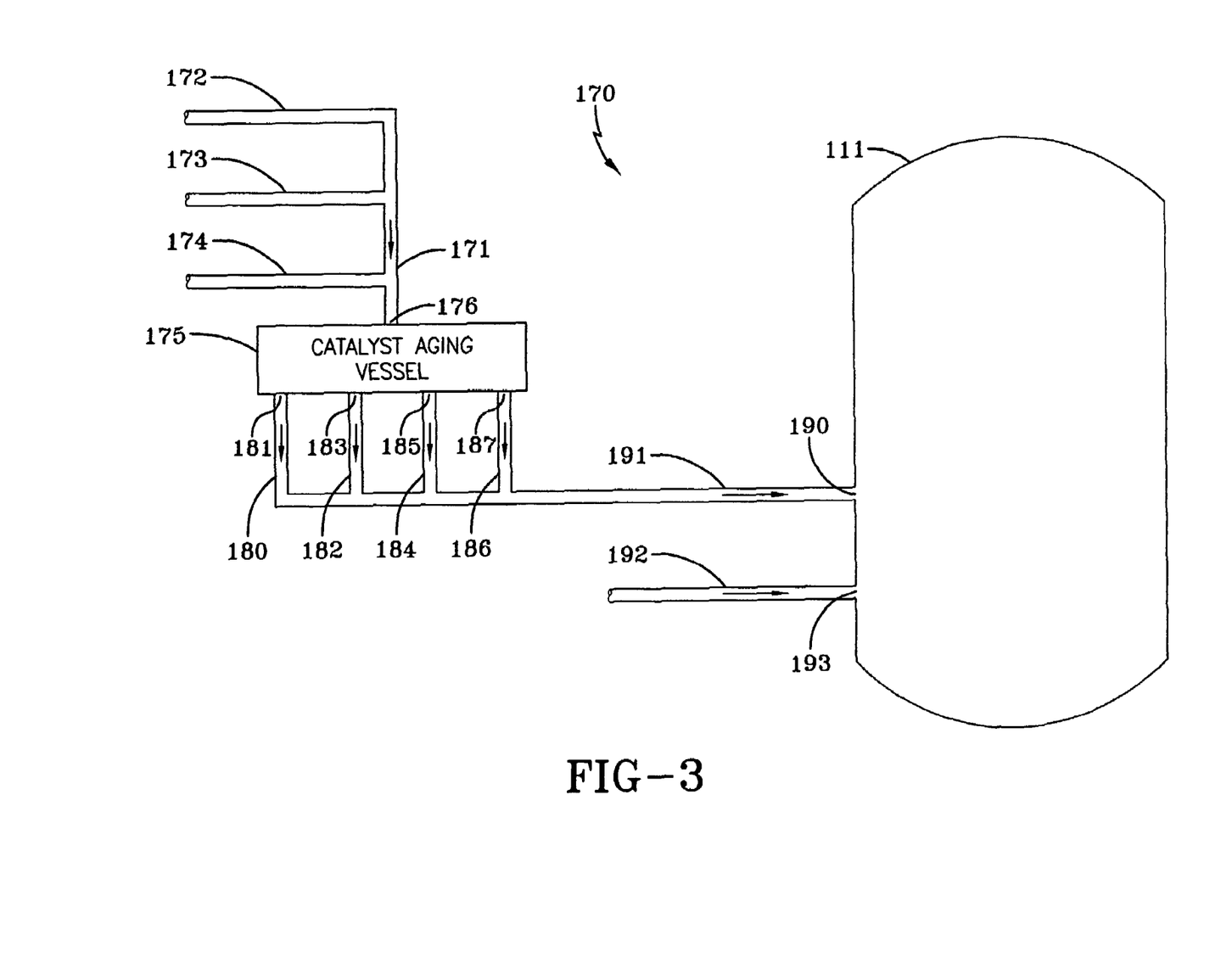
FIG. 3 is a diagrammatical depiction of a vessel for practicing the first stage of the process of this invention by employing a lanthanide catalyst system.

In another embodiment, where a lanthanide-based catalyst system is employed, an exemplary system for introducing catalyst ingredient and raw material into reactor 111 is shown in FIG. 3. This system 170 includes catalyst aging vessel 175. Lanthanide compound (e.g., neodymium versatate), alkylating agent (e.g., tributyl aluminum), and monomer can be injected into aging vessel 175 at inlet 176 via first feed line 171. The lanthanide compound can be fed to first feed line 171 via lanthanide feed line 172, alkylating agent can be fed to first feed line 171 via alkylating agent feed line 173, and monomer can be fed to first feed line 171 via monomer feed line 174. Monomer may enter first feed line 171 prior to the catalyst ingredients. Accordingly, in this embodiment, the lanthanide compound, alkylating agent, and monomer may be combined within first feed line 171 prior to introduction into aging vessel 175 at inlet 176.

Aging vessel 175 can be designed to allow the lanthanide compound, alkylating agent, and monomer to age for multiple time intervals prior to introduction to reactor 111 at inlet 190 via fourth feed line 191. For example, aging vessel 175 can have multiple outlets (e.g., first outlet 181, second outlet 183, third outlet 185, and fourth outlet 187) whereby each outlet releases a mixture of lanthanide compound, alkylating agent, and monomer, that has been aged for distinct time intervals. For example, mixture exiting outlet 181 can be aged for about 0 to 1 minutes, mixture exiting outlet 183 can be aged for about 5 minutes, mixture exiting outlet 185 can be aged for about 10 minutes, and the mixture exiting outlet 187 can be aged fro about 20 minutes. These various mixtures can then be introduced to fourth feed line 191 via exit lines 180, 182, 184, and 186 respectively. In one or more embodiments, aging vessel 175 can be operated with only one outlet open so that the catalyst delivered to the process may have a substantially constant aging time rather than a distribution of aging times. The source of halogen can be fed to reactor 111 via halogen feed line 192 at inlet 193.

In one or more embodiments, the process of this invention may allow for the production of polymers having targeted properties. In certain embodiments, the process can advantageously be employed to synthesize polybutadiene having particular characteristics that allow the polybutadiene to be employed for specialized uses.

In one or more embodiments, where a lanthanide-based catalyst system is employed, the process of this invention may produce polybutadiene having a molecular weight distribution of less than 4, in other embodiments less than 3.5, in other embodiments less than 3, and in other embodiments less than 2.5.

In one or more embodiments, where a lanthanide-based catalyst system is employed, the process of this invention may advantageously be employed to produce polybutadiene having a cis content in excess of about 97%, in other embodiments in excess of about 98%, and in other embodiments in excess of about 99%.

In one or more embodiments, where the lanthanide-based catalyst system is employed, the process of this invention may advantageously allow for the functionalization of a significant number of polybutadiene ends. As those skilled in the art will appreciate, the ability to functionalize the ends of the polybutadiene may be related to the reactiveness of the polymer with a nucleophile (i.e., the ability of the polymer to undergo nucleophilic attack). This is commonly referred to as the living or pseudo-living nature of the polymer prior to terminating or quenching the polymerization, which termination or quenching greatly reduces or precludes this reactivity to a nucleophile. In one or more embodiments, the process of this invention may advantageously provide a polymerization medium to the second stage of the process wherein the polymerization medium at this point is characterized by having at least 10% of the polymers with reactive or live ends, in other embodiments at least 20% of the polymers with reactive or live ends, in other embodiments greater than 40% of the polymers with reactive or live ends, and in other embodiments greater than 60% of the polymers with reactive or live ends.

Also where a cobalt-based catalyst system is employed, the process of this invention may advantageously produce highly branched polymers. These highly branched polymers may be characterized by having a solution viscosity less than that of a linear polymer of the same molecular weight.

In one or more embodiments, the process of the present invention can be employed to achieve certain target Mooney viscosities for the polymer product. For example, where a neodymium-based catalyst system is employed, a Mooney viscosity ($ML_{1+4}$@100° C.) of from about 15 to about 45, in other embodiments from about 20 to about 40, and in other embodiments from about 25 to about 35 can be achieved. Alternatively, where a cobalt-based catalyst system is employed, a Mooney viscosity of from about 30 to about 55, in other embodiments from about 33 to about 48, and in other embodiments from about 38 to about 45 can be achieved.

Various modifications and alterations that do not depart from the scope and spirit of this invention will become apparent to those skilled in the art. This invention is not to be duly limited to the illustrative embodiments set forth herein.

What is claimed is:

1. A method for the continuous production of polydienes, comprising:
   (a) adding liquid conjugated diene monomer, a coordination catalyst system, and, optionally an organic solvent to a first vessel, wherein the first vessel includes less than 20% by weight organic solvent;
   (b) allowing the monomer to polymerize into polydienes, the monomer, catalyst system, optional solvent, and polydienes forming a polymerization medium, wherein the polymerization of the monomer increases the temperature of the polymerization medium thereby converting a portion of the monomer to a gas-phase monomer;
   (c) agitating the polymerization medium to thereby facilitate conversion of a portion of the monomer to the gas-phase monomer;
   (d) removing the gas-phase monomer from the vessel;
   (e) optionally condensing the gas-phase monomer that is removed from the vessel to liquid monomer;
   (f) optionally transferring the condensed liquid monomer back to the first vessel;
   (g) removing a portion of the polymerization medium from the first vessel in order to maintain a monomer concentration within the first vessel of at least 80% by weight of the polymerization medium within the first vessel, and in order to maintain a head space within the first vessel that is about 40 to about 60% of the volume of the first vessel, where said portion of the polymerization medium that is removed includes residual monomer;
   (h) transferring the polymerization medium removed from the first vessel to a second vessel;
   (i) agitating and maintaining the flow of the polymerization medium within the second vessel;
   (j) maintaining sufficient temperature within the second vessel in order to convert a portion of the residual monomer to a gas-phase residual monomer;
   (k) optionally condensing the gas-phase residual monomer removed from the second reactor to liquid monomer;
   (l) optionally transferring liquid monomer converted from the gas-phase monomer removed from the second vessel to the first vessel;
   (m) optionally adding a functionalizing agent to the second vessel in order functionalize polydienes within the second reactor;
   (n) adding a quenching agent to the second vessel in order to terminate the further polymerization of monomer; and
   (o) recovering polydienes.

2. The method of claim 1, wherein a head space of about 30 to about 70% of the volume of the second vessel is maintained within the second vessel.

3. The method of claim 1, where the coordination catalyst system comprises a lanthanide-based catalyst system or a cobalt-based catalyst system.

4. The method of claim 1, where the conjugated diene monomer comprises 1,3-butadiene, where the polydienes recovered from the process are characterized by having a molecular weight distribution of less than 4, a cis content in excess of about 97%, and include in excess of 10% of the individual polymers having live ends.

5. A method for the continuous production of polydienes, comprising:
   (a) continuously charging a mixture of one or more monomer, catalyst system, and less than 20% by weight organic solvent based on the total weight of the monomer, catalyst and solvent, into a first vessel to form a polymerization medium;
   (b) continuously polymerizing the monomer in the first vessel to form a mixture of reactive polymer and monomer;
   (c) continuously removing the mixture of reactive polymer and monomer from the vessel to maintain a monomer concentration within the first vessel of at least 80% by weight of the polymerization medium within the first vessel;
   (d) transferring the mixture of reactive polymer and monomer removed from the first vessel to a second vessel; and
   (e) continuously terminating the reactive polymer prior to a total monomer conversion of 25% by weight based on the total weight of the original monomer feed.

6. The method of claim 5, where said step of polymerizing monomer in the first vessel achieves up to about 15% monomer conversion.

7. The method of claim 5, where the monomer comprises 1,3-butadiene.

8. The method of claim 5, where the catalyst system comprises a lanthanide-based catalyst system or a cobalt-based catalyst system.

9. The method of claim 8, where the catalyst system comprises a lanthanide-based catalyst system and the monomer comprises 1,3-butadiene, and wherein the process produces polybutadiene characterized by having a molecular weight distribution of less than 4, a cis content in excess of about 97%, and at least 10% of the polymer having live ends.

10. The method of claim 5, where the monomer includes conjugated dienes, the catalyst system includes a cobalt-based catalyst system, and where the method produces branched polydienes characterized by having a solution viscosity less than that of a linear polymer of the same molecular weight.

11. The method of claim 5, further comprising maintaining the mixture of reactive polymer and monomer at a temperature below about 65° C.

12. The method of claim 5, further comprising the step of maintaining the mixture of reactive polymer and monomer at a temperature below about 30° C.

13. The method of claim 9, where said step of terminating the reactive polymer includes functionalizing the reactive polymer.

14. The method of claim 5, further comprising functionalizing the reactive polymer.

15. The method of claim 1, wherein the organic solvent is present in the first vessel at less than 10% by weight, based on the total weight of the monomer, polymer, and solvent within the first vessel.

16. The method of claim 1, wherein the organic solvent is present in the first vessel at less than 5% by weight, based on the total weight of the monomer, polymer, and solvent within the first vessel.

17. The method of claim 1, wherein the organic solvent is present in the first vessel at less than 2% by weight, based on the total weight of the monomer, polymer, and solvent within the first vessel.

18. The method of claim 1, wherein there is a substantial absence of organic solvent in the first vessel.

19. The method of claim 5, wherein the organic solvent is present in the first vessel at less than 10% by weight, based on the total weight of the monomer, polymer, and solvent within the first vessel.

20. The method of claim 5, wherein the organic solvent is present in the first vessel at less than 5% by weight, based on the total weight of the monomer, polymer, and solvent within the first vessel.

21. The method of claim 5, wherein the organic solvent is present in the first vessel at less than 2% by weight, based on the total weight of the monomer, polymer, and solvent within the first vessel.

22. The method of claim 5, wherein there is a substantial absence of organic solvent in the first vessel.

23. The method of claim 5, where said step of polymerizing the monomer in the first vessel increases the temperature of the mixture and converts a portion of the monomer to a gas-phase monomer.

24. The method of claim 23, further comprising the step of agitating the mixture of reactive polymer and monomer to thereby facilitate conversion of a portion of the monomer to the gas phase monomer.

25. The method of claim 24, further comprising the step of removing the gas phase monomer from the first vessel.

26. The method of claim 25, further comprising the step of condensing the gas phase monomer that is removed from the first vessel to liquid monomer.

27. The method of claim 26, further comprising the step of transferring the condensed liquid monomer back to the first vessel.

28. The method of claim 5, further comprising the step of agitating and maintaining the flow of the mixture of reactive polymer and monomer within the second vessel.

29. The method of claim 28, further comprising the step of maintaining a sufficient temperature within the second vessel in order to convert a portion of the residual monomer to gas phase residual monomer.

30. The method of claim 29, further comprising the step of condensing the gas phase residual monomer removed from the second reactor to liquid monomer.

31. The method of claim 30, further comprising transferring liquid monomer converted from the gas-phase monomer removed from the second vessel to the first vessel.

32. The method of claim 31, further comprising the step of adding a functionalizing agent to the second vessel in order functionalize polydienes within the second reactor.

33. The method of claim 32, further comprising the step of adding a quenching agent to the second vessel in order to terminate the further polymerization of monomer.

34. The method of claim 1, wherein said steps (a) through (o) are continuous.

* * * * *